(12) United States Patent
Kim et al.

(10) Patent No.: US 7,349,706 B2
(45) Date of Patent: Mar. 25, 2008

(54) LOCATION INFORMATION OF EMERGENCY CALL PROVIDING SYSTEM USING MOBILE NETWORK

(76) Inventors: SeongSoo Kim, 108-207, Saemteo Maeul Apt. 718, Ilwon-bondong, Gangnam-gu, Seoul (KR); HanSeok Kim, 108-207, Saemteo Maeul Apt. 718, Ilwon-bondong, Gangnam-gu, Seoul (KR)

( * ) Notice: Subject to any disclaimer, the term of this patent is extended or adjusted under 35 U.S.C. 154(b) by 0 days.

(21) Appl. No.: 10/523,365

(22) PCT Filed: Apr. 10, 2003

(86) PCT No.: PCT/KR03/00726

§ 371 (c)(1),
(2), (4) Date: Feb. 7, 2005

(87) PCT Pub. No.: WO2004/016030

PCT Pub. Date: Feb. 19, 2004

(65) Prior Publication Data

US 2005/0239477 A1    Oct. 27, 2005

(30) Foreign Application Priority Data

Aug. 8, 2002 (KR) ............... 10-2002-0046768
Mar. 3, 2003 (KR) ............... 10-2003-0013185

(51) Int. Cl.
*H04Q 7/20* (2006.01)

(52) U.S. Cl. ............... 455/456.1; 455/404.1; 455/414.1; 455/410; 455/411; 713/168

(58) Field of Classification Search ............ 455/404.2, 455/421, 521, 404.1, 414.1, 410, 411, 456.1
See application file for complete search history.

(56) References Cited

U.S. PATENT DOCUMENTS 5,479,482 A * 12/1995 Grimes .................. 455/556.1

(Continued)

FOREIGN PATENT DOCUMENTS

JP    2001-8265 A    1/2001

(Continued)

OTHER PUBLICATIONS

International Search Report, no date listed.

*Primary Examiner*—Rafael Perez-Gutierrez
*Assistant Examiner*—Kwasi Karikari
(74) *Attorney, Agent, or Firm*—Sughrue Mion, PLLC

(57) ABSTRACT

The present invention relates to a system for providing location information using a mobile communication network, and more particularly, to a system for providing emergency relief location information using a mobile communication network, by which location and situation information of a mobile communication subscriber can be easily known through the mobile communication network using the mobile communication terminal. An object of the present invention is to provide a system for providing emergency relief location information using a mobile communication network, capable of notifying location and situation information of a given mobile communication subscriber who is placed in an emergency situation through a mobile communication terminal of a given relief personnel adjacent to the place where the emergency situation has occurred. Another object of the present invention is to provide a system for providing emergency relief location information using a mobile communication network, which can prevent in advance illegal deposit withdrawal by stopping a transaction of financial accounts owned by a given mobile communication subscriber in case of emergency. Still another object of the present invention is to provide a system for providing location information using a mobile communication network, which can provide location information that allows the location among the mobile communication subscribers to be easily found through the satellite communications and the mobile communication network.

6 Claims, 11 Drawing Sheets

U.S. PATENT DOCUMENTS

| | | | |
|---|---|---|---|
| 5,937,355 A * | 8/1999 | Joong et al. | 455/466 |
| 2002/0034960 A1* | 3/2002 | Muranaga | 455/517 |
| 2004/0203842 A1* | 10/2004 | Hanninen et al. | 455/456.1 |
| 2006/0003809 A1* | 1/2006 | Boling et al. | 455/564 |

FOREIGN PATENT DOCUMENTS

| | | |
|---|---|---|
| KR | 2001-0008938 | 2/2001 |
| KR | 2001-0081118 | 8/2001 |

\* cited by examiner

< Relief requester information>

Name : Hong Gil-Dong

Social NO. : 671009-1234567

Address : Yeoksam-dong, Kangnam-Ku, Seoul, Korea

Message : Urgent, Please help me.

Fig. 3c

```
< Relief requester information>
Name : Hong Gil-Dong
Social NO. : 671009-1234567
Address : Yeoksam-dong, Kangnam-Ku, Seoul, Korea
Message : Urgent, Please help me.
```

< Message from Hong Gil - Dong >

I am at the bus stop at the front of Dacom topographic features.

LOCATION INFORMATION OF EMERGENCY CALL PROVIDING SYSTEM USING MOBILE NETWORK

TECHNICAL FIELD

The present invention relates to a system for providing location information using a mobile communication network, and more particularly, to a system for providing emergency relief location information using a mobile communication network, by which location and situation information of a mobile communication subscriber can be easily known through the mobile communication network using the mobile communication terminal.

BACKGROUND ART

As noted, a mobile communication system enables a user to make voice communications with a counterpart by wireless even at a place where a wired telephone is not installed while moving. A portable mobile communication terminal is used as a terminal for enabling radio communication. The voice communication is easily accomplished by the wireless communications between the mobile communication base station transceivers installed every region and the mobile communication terminal.

Furthermore, in such a mobile communication system, not only wireless voice communications are made between the mobile communication terminals or between the wired telephone and the mobile communication terminal but also short messages are exchanged among the mobile communication terminals using the short message service (SMS).

In other words, in an emergency, a mobile communication subscriber who is carrying this mobile communication terminal can rapidly make voice communications with a target counterpart using the terminal without moving to a place where the wired telephone is installed.

However, in the mobile communication system adopting the conventional mobile communication terminal, if the mobile communication subscriber could not directly make voice communications or is placed in an emergency situation where the voice communications could not be sent outside, i.e., a threat situation such a red-handed robber, a violent criminal, etc., shadowing by a criminal for an illegal purpose, intrusion into the inside of a house by an invited guest, a distress situation at the mountains, and the like, it is impossible to make voice communications with a desired counterpart using the mobile communication terminal. Due to this, there has been a serious problem that the person concerned must suffer from any convenience that may be caused by the emergency situation.

Furthermore, even if the mobile communication subscriber is successful in making voice communications with an emergency contact point such as a police station, a firehouse, etc. in order to cope with the emergency situation, there are problems that the personnel participating in the emergency contact point could not know the place where the emergency situation has occurred and how the situation is going, if the mobile communication subscriber could not explain all the details about the emergency situation.

Additionally, although the emergency situation on the mobile communication subscriber is rapidly seen, it is not easy to find relief personnel that can resolve the emergency situation of a corresponding mobile communication subscriber. Also, even if the relief personnel adjacent to the mobile communication subscriber are found, there is a problem that long time is taken in order for the personnel to know the emergency situation in detail.

Meanwhile, in order for one mobile communication subscriber to find the location of the other mobile communication subscriber due to a specific reason (for example, meeting at a given place), the one mobile communication subscriber has to trace the location of the other mobile communication subscriber while communicating with him or her. This makes the subscribers inconvenient.

DISCLOSURE OF INVENTION

Accordingly, the present invention has been made in view of the above problems, and it is an object of the present invention to provide a system for providing emergency relief location information using a mobile communication network, capable of notifying location and situation information of a given mobile communication subscriber who is placed in an emergency situation through a mobile communication terminal of a given relief personnel adjacent to the place where the emergency situation has occurred.

Another object of the present invention is to provide a system for providing emergency relief location information using a mobile communication network, which can prevent in advance illegal deposit withdrawal by stopping a transaction of financial accounts owned by a given mobile communication subscriber in case of emergency.

Still another object of the present invention is to provide a system for providing location information using a mobile communication network, which can provide location information that allows the location among the mobile communication subscribers to be easily found through the satellite communications and the mobile communication network.

To achieve the above objects, according to the present invention, there is provided a system for providing emergency relief location information using a mobile communication network, including a mobile communication terminal for a relief requester, the terminal having an emergency key for requesting a relief, a storage means for storing emergency contact information for emergency contact in an emergency mode and emergency contact information to be transmitted to an emergency management system being an emergency contact point, and a control means for performing the emergency mode, wherein the control means comprises an emergency mode setting unit that confirms the state of a power switch after sensing that the emergency key is depressed, and turning on the power switch to perform the emergency mode when the power is off so that the emergency mode is performed regardless of the on/off state of the power, an emergency contact information transmit unit that makes a call connection with the emergency management system of the emergency contact point stored in the emergency mode and then transmits emergency contact information stored at the storage means to the emergency management system of the emergency contact point, and a tapping mode control unit for automatically performing a tapping mode, in the emergency mode, that limitedly permits only a call connection request to the emergency management system, precludes a receiving speech and transmits only a transmitting sound during the call connection, and the emergency management system of the emergency contact point having an emergency information management server that finds a location of the mobile communication terminal for the relief requester according to emergency contact information from the mobile communication terminal for the relief requester that is transferred through the mobile communication network, and then transmitting emergency contact information and location information of the relief requester that are received from the mobile communication terminal for the relief requester to a mobile communication terminal of a relief personnel adjacent to the mobile communication terminal for the relief requester.

According to the present invention, in the event where an emergency situation happens to a mobile communication subscriber, a specific emergency key button of the mobile communication terminal is manipulated to operate an emergency mode. An emergency situation message and information on a current location are thus sent to the emergency contact point in a non-sound/non-light mode. Then, the emergency contact point calls the relief personnel nearest to the mobile communication subscriber where the emergency situation happened, through the mobile communication network, and informs him or her of a current location of the relief requester. At the same time, the relief requester can hear a tapping sound through his or her mobile communication terminal according to a tapping mode. As such, as desired relief personnel and the nearest personnel is informed of the emergency situation rapidly and exactly, it is possible to cope with the emergency situation at an early stage.

Furthermore, if the emergency mode is executed in the mobile communication terminal for a given relief request, a transaction of the financial accounts owned by the relief requester is rapidly stopped, a virtual transaction is executed, etc. Accordingly, in case of a kidnapping condition by a robber or a criminal, a monetary loss that may be applied to the relief requester can be minimized and the criminal can be easily caught.

In addition, if a mobile communication terminal on a transmitter' side sends a detected positioning signal depending on its current location based on satellite signals, the detected positioning signal is converted into map data of a message/graphic form so that they can be transmitted to a mobile communication terminal on a desired receiver' side. Accordingly, it is possible to rapidly and exactly find the location among the mobile communication subscribers over the mobile communication network.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings.

Figure 1:
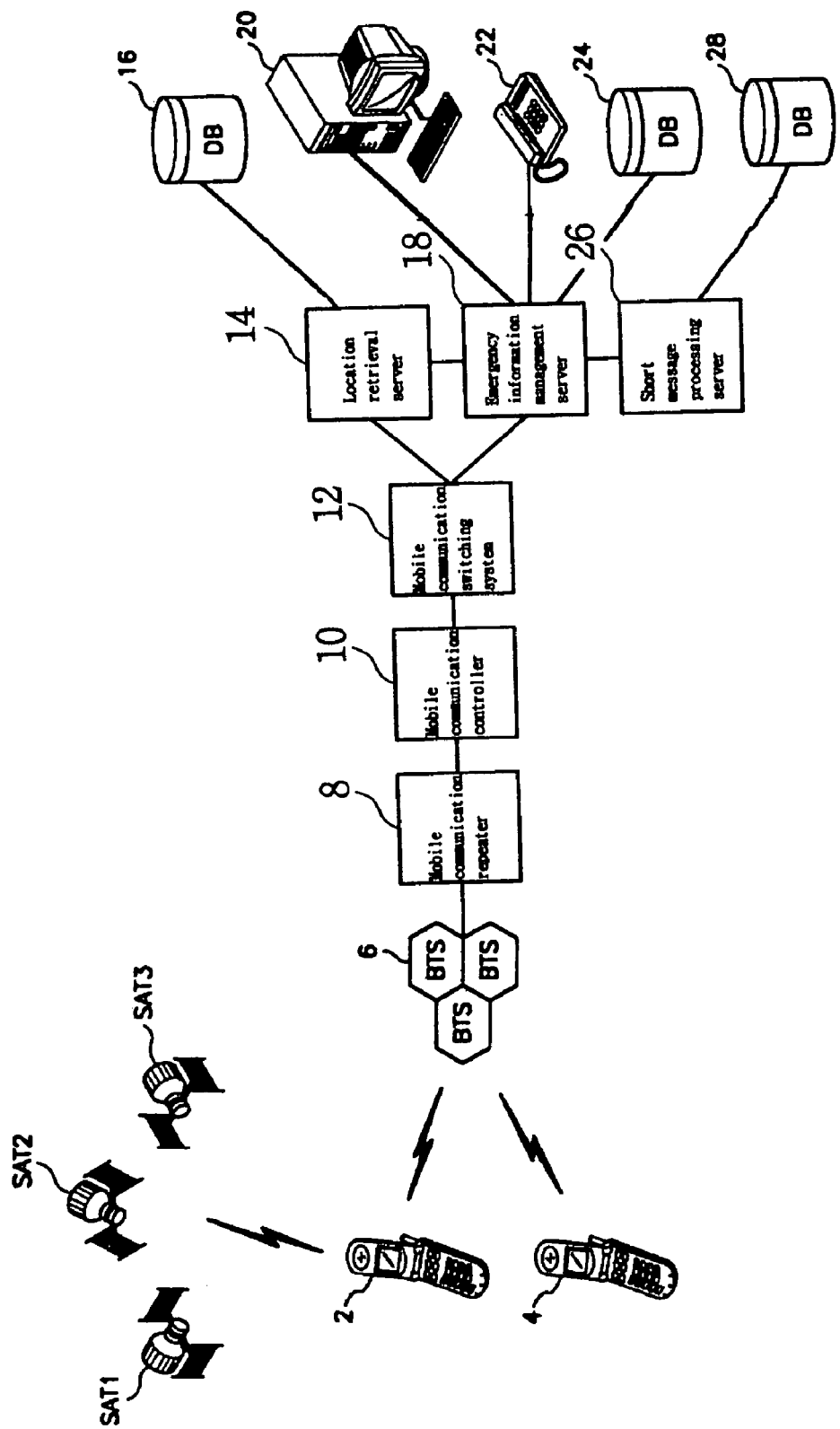
FIG. 1 is a diagram illustrating the construction of a system for providing emergency relief location information using a mobile communication network according to a first embodiment of the present invention.

FIG. 1 is a diagram illustrating the construction of a system for providing emergency relief location information using a mobile communication network according to a first embodiment of the present invention.

As shown in FIG. 1, the mobile communication system includes a mobile communication terminal 2 for a relief request, a mobile communication terminal 4 for relief personnel, a plurality of mobile communication base station transceivers 6, a mobile communication repeater 8, a mobile communication controller 10 and a mobile communication switching system 12. An emergency management system includes a location retrieval server 14, a location retrieval database 16, an emergency information management server 18, a management computer terminal 20, a telephone 22, an emergency information database 24, a short message processing server 26 and a short character database 28. GPS satellites SAT1~SAT3 are further included in the mobile communication system.

In FIG. 1, the mobile communication terminal 2 for the relief request is manipulated by a mobile communication subscriber who is placed in an emergency situation such as a threat situation by a red-handed robber, a violent criminal, etc., shadowing by a criminal for an illegal purpose, intrusion into the inside of a house by an invited guest, a distress condition at the mountains, and the like. The mobile communication terminal 2 has a single emergency key button as a means for informing the emergency situation at a given location of the terminal.

In the above, it may be preferred that a new emergency key button is installed at a specific location of the mobile communication terminal 2, for example at the lateral side of the terminal where the fingers can easily touch when the terminal is held by the hands. However, it should be noted that the known key button in the mobile communication terminal might be used intact as the emergency key button of the present invention.

In the mobile communication terminal 2 for the relief request, if the emergency key button is continually depressed for a certain time period (for example 3 seconds), an emergency mode is automatically executed. Emergency information stored therein is then transmitted, by wireless, to the emergency contact point such as the police station, the firehouse, etc., i.e., the emergency information management server 18 via the mobile communication network.

At this time, if the emergency key button is manipulated as above even when the power switch of the terminal is off, the power is automatically turned on to perform the emergency mode.

The mobile communication terminal 2 for the relief request has a GPS (global positioning system) receiving function. If the emergency mode is executed, the terminal traces satellite signals transmitted from the GPS satellites SAT1 to SAT3 to calculate coordinates on the longitude and latitude. The terminal 2 then transmits the detected positioning signal to the emergency information management server 18 over the mobile communication network.

Furthermore, in a state where emergency information is transmitted to the emergency information management server 18, the mobile communication terminal 2 for the relief request can limitedly permit only a request for a call connection from a corresponding emergency contact point. Also, the terminal 2 is switched to a non-sound/non-light mode to preclude one-sidedly a call connection from a wired telephone or a mobile communication terminal of other counterpart. Further, if a limited call connection with the emergency information management server 18 is established, the terminal 2 is automatically switched to a tapping mode, thus precluding a receiving speech received from the emergency information management server 18 and also transmitting the sound around it as a sending speech.

Meanwhile, if the emergency mode is executed and the call connection with the emergency information management server 18 is established, the mobile communication terminal 2 for the relief request transmits information on a relief requester and a given short message signal that were previously stored over the mobile communication network.

In FIG. 1, the mobile communication terminal 4 for the relief personnel has also the GPS receiving function. Therefore, the terminal 4 can trace satellite signals from the GPS satellites SAT1 to SAT3 to calculate the coordinates on the longitude and latitude. The terminal 4 can then periodically transmit a detected positioning signal accordingly to the emergency information management server 18 over the mobile communication network. Therefore, the terminal 4 can periodically report a location variation state of the relief personnel depending on time elapsed.

The mobile communication terminal 4 for the relief personnel can receive information on the relief requester and the short message of the mobile communication terminal 2 for the relief request that is operating in the emergency mode, from the emergency information management server 18 over the mobile communication network, and then display them thereon. Further, the emergency information management server 18 can display a location information signal that is written based on the detected positioning signal that was received from the mobile communication terminal 2. As a result, the location of a corresponding relief requester can be exactly found.

Further, the mobile communication terminal 4 for the relief personnel can receive a tapping sound signal from the mobile communication terminal 2 for the relief request and then output it audibly, through the manipulation of the emergency information management server 18.

In FIG. 1, the plurality of the mobile communication base station transceivers BTS 6 are distributed around the place where the mobile communication terminal 2 for the relief request and the mobile communication terminal 4 for the relief personnel are moving. The mobile communication base station transceivers 6 can transmit and receive, by wireless, sound and detected satellite signals, messages, graphic information, etc., by matching the mobile communication terminal 4 for the relief personnel or the wired telephone 22 by wireless. Therefore, the mobile communication terminal 2 can make a voice communication and transfer/register wireless data while moving.

The mobile communication repeater 8 is responsible for connection of the respective mobile communication base station transceivers 6 and the mobile communication controller 10. The mobile communication controller 10 controls a matching function, a handoff handling between the respective base station transceiver cells, and the call connection of the mobile communication base station transceivers 6 via the mobile communication repeater 8.

In FIG. 1, the mobile communication switching system 12 performs an interactive call connection between the mobile communication terminal 2 for the relief request and the mobile communication terminal 4 for the relief personnel, and the emergency information management server 18, whereby voice communications can be established, and the detected positioning signal, character and graphic information can be transferred.

The location retrieval server 14 can produce a location information signal of the message or graphic form based on the detected positioning signal from the mobile communication terminal 2 for relief request, at the request of the emergency information management server 18 to trace the location of the mobile communication terminal 2.

The location retrieval database 16 has stored therein map information on the entire region where the mobile communication terminal 2 and the mobile communication terminal 4 can move, and character information on the name of a place and topographic features. Further, the database 16 can periodically update the detected positioning signal that is periodically received from the mobile communication terminal 4 for the relief personnel.

In the above, the location retrieval server 14 can produce the location information signal of the character and graphic signal form for finding the location of the mobile communication terminal 2 for the relief request, based on the map information and the character information on the name of a place and the topographic features stored in the location retrieval database 16. If the location of the mobile communication terminal 2 is found, the search retrieval server 14 retrieves the nearest mobile communication terminal for relief personnel from the plurality of the mobile communication terminals for the relief personnel that are stored in the location retrieval database 16.

The emergency information management server 18 can receive information on the relief requester and short character information transmitted from the mobile communication terminal 2, by performing a call connection with the mobile communication terminal 2 via the mobile communication switching system 12. After the detected positioning signal is received, the emergency information management server 18 requests a location retrieval to the location retrieval server 14 so that the location information signal can be generated and the mobile communication terminal 4 for the relief personnel adjacent to the mobile communication terminal 2 for the relief request can be retrieved.

The emergency information management server 18 attempts a call connection with the mobile communication terminal 2 for the relief request and the mobile communication terminal 4 for the relief personnel, thus transmitting information on the relief requester and short character information that were received from the mobile communication terminal 2 and the location information signal of the character and graphic signal form.

Further, if the receiving speech signal is received as the mobile communication terminal 2 executes the tapping mode, the emergency information management server 18 controls the mobile communication switching system 12 to transmit the receiving speech signal to the mobile communication terminal 4 for the relief personnel.

At this time, the emergency information management server 18 can control the management computer terminal 20 to display information on the relief requester and short character information so that they can be visually viewed. The emergency information management server 18 can control the management computer terminal 20 to display the location information signal of the character and graphic signal form that was generated by the location retrieval server 14.

Furthermore, the emergency information management server 18 can control the telephone 22 to receive the receiving speech transmitted by the mobile communication terminal 2 in accordance with the emergency mode. Further, the emergency information management server 18 can control information on the relief requester, short character information, the location information signal and the receiving speech content to be stored in the emergency information database 24 and the short character database 28, respectively.

The emergency information database 24 has stored therein information on telephone numbers and information on the relief personnel for the plurality of the mobile communication terminals 4 for the relief personnel, which are distributed across the region. Further, the database 24 has stored therein the location information signal for the mobile communication terminal 2 for the relief request and the receiving speech signal by the tapping mode, every relief requester, under the control of the emergency information management server 18.

The short message processing server 26 processes information on the relief requester and short character information included in the emergency information that are transmitted from the mobile communication terminal 2, and then enables them to be displayed through the management computer terminal 20 and the mobile communication terminal 4 for the relief personnel. At the same time, the short message processing server 24 allows information on the relief requester and short character information to be stored in the short character database 28.

Figure 2:
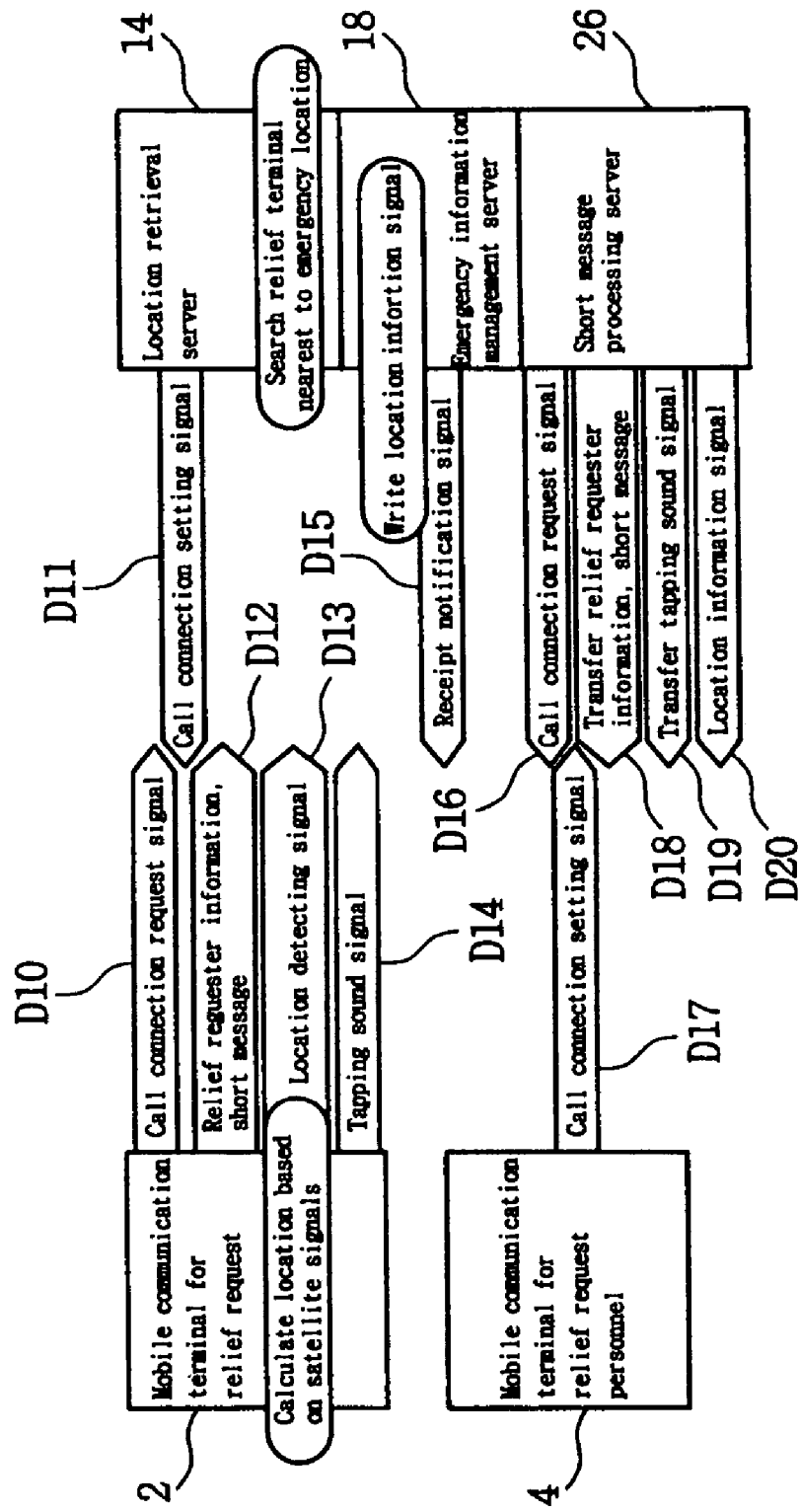
FIG. 2 shows a process flow of a method for providing emergency relief location information through the mobile communication network according to a first embodiment of the present invention, FIG. 3a to FIG. 3c exemplarily show states where location information of a relief requester is displayed on a mobile communication terminal for the relief personnel according to a first embodiment of the present invention.

FIG. 2 shows a process flow of a method for providing emergency relief location information through the mobile communication network according to a first embodiment of the present invention.

As shown in FIG. 2, if the emergency mode is executed, the mobile communication terminal 2 for the relief request transmits a call connection request signal (D10) via an emergency contact point that was previously stored, i.e., the telephone number of the emergency information management server 18. If the call connection request signal is received over the mobile communication network, the emergency information management server 18 permits the call connection to generate a call connection setting signal (D11).

If the call connection with the emergency information management server 18 is established, the mobile communication terminal 2 for the relief request transmits information on the relief requester and short character information containing emergency information (D12), which were previously stored. The mobile communication terminal 2 then transmits a detected positioning signal (D13) that is calculated as a result of calculating the coordinates on the longitude/latitude based on the satellite signals from the GPS satellites SAT1 to SAT3.

If the detected positioning signal (D13) is received from the mobile communication terminal 2 for the relief request, the emergency information management server 18 requests a location retrieval to the location retrieval server 14. Accordingly, the location retrieval server 14 produces a location information signal of a character and graphic signal form based on the detected positioning signal, and also retrieves a mobile communication terminal 4 for the relief personnel nearest to the emergency location of the mobile communication terminal 2 for the relief request.

At this time, the emergency information management server 18 may select one or more relief personnel in an order of the nearest to the mobile communication terminal 2 for the relief request, as a result of the retrieval by the location retrieval server 14.

Also, the mobile communication terminal 2 for the relief request executes the tapping mode to transmit the receiving speech for informing the surrounding emergency situation, i.e., the tapping sound signal (D14) to the emergency information management server 18 over the mobile communication network. If the call connection with at least one nearby mobile communication terminal 4 for the relief personnel that was found by the location retrieval operation of the location retrieval server 14 and various information are thus received, the emergency information management server 18 transmits a receipt report signal (D15) informing that the emergency situation has been notified to the relief personnel.

Accordingly, if the receipt report signal is received form the emergency information management server 18, the mobile communication terminal 2 for the relief request performs a vibration mode to generate vibration of a signal sound form as a means for informing that the emergency situation has sent to the relief personnel (for example, relatively weak vibration is continually generated 3 times).

If the location retrieval server 14 retrieves the mobile communication terminal 4 for the relief personnel nearest to the place where the emergency situation has occurred, the emergency information management server 18 generates the call connection request signal (D16) for the mobile communication terminal 4 for the relief personnel. If the call connection setting signal (D17) is generated according to the call connection response of the mobile communication terminal 4 for the relief personnel, the emergency information management server 18 transfers information on the relief requester and short character information (D18) that were received from the mobile communication terminal 2 for the relief request, transfers the receiving speech received according to the tapping mode as the tapping sound signal (D19), and also transfers a location information signal (D20) of the character and graphic signal form.

Figures 3A, 3B:
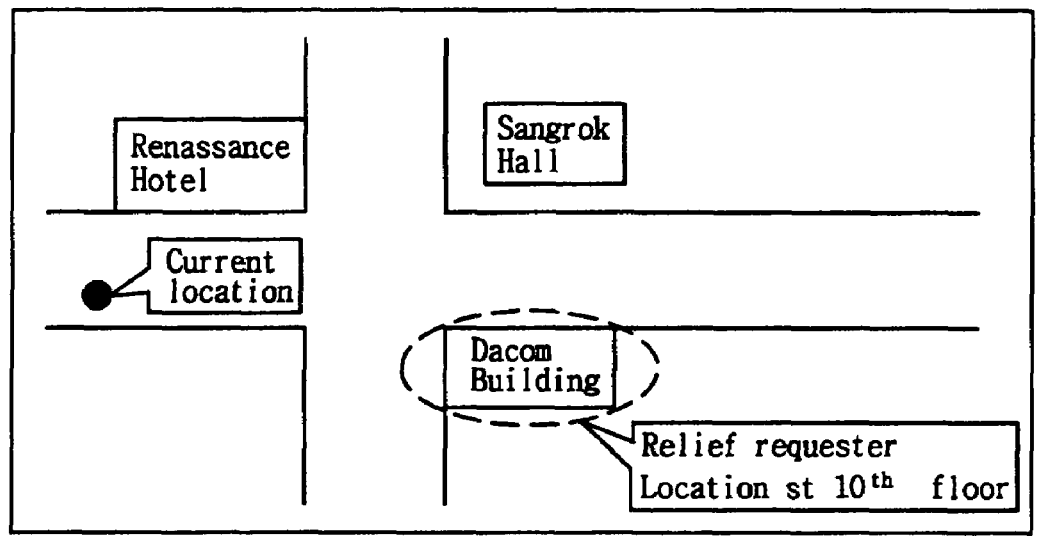

In other words, if information on the relief requester and short character information are received via the emergency information management server 18, the mobile communication terminal 4 for the relief personnel has displayed, on its display unit, a name, a social card number, an address and a telephone number of a relief requester, and a message reading "Urgent, Please Help Me", as shown in FIG. 3a.

Further, if the location information signal of the graphic signal form is received via the emergency information management server 18, the mobile communication terminal 4 for the relief personnel has simultaneously displayed, on the map data of a graphic form, a current location of the relief personnel and a current location of a relief requester, as shown in FIG. 3b. Meanwhile, if the location information signal of the message signal form is received, the mobile communication terminal 4 has displayed, in the form of the message, the current location of the relief requester in connection with the locations of related topographic features, as shown in FIG. 3c.

Figure 4A:
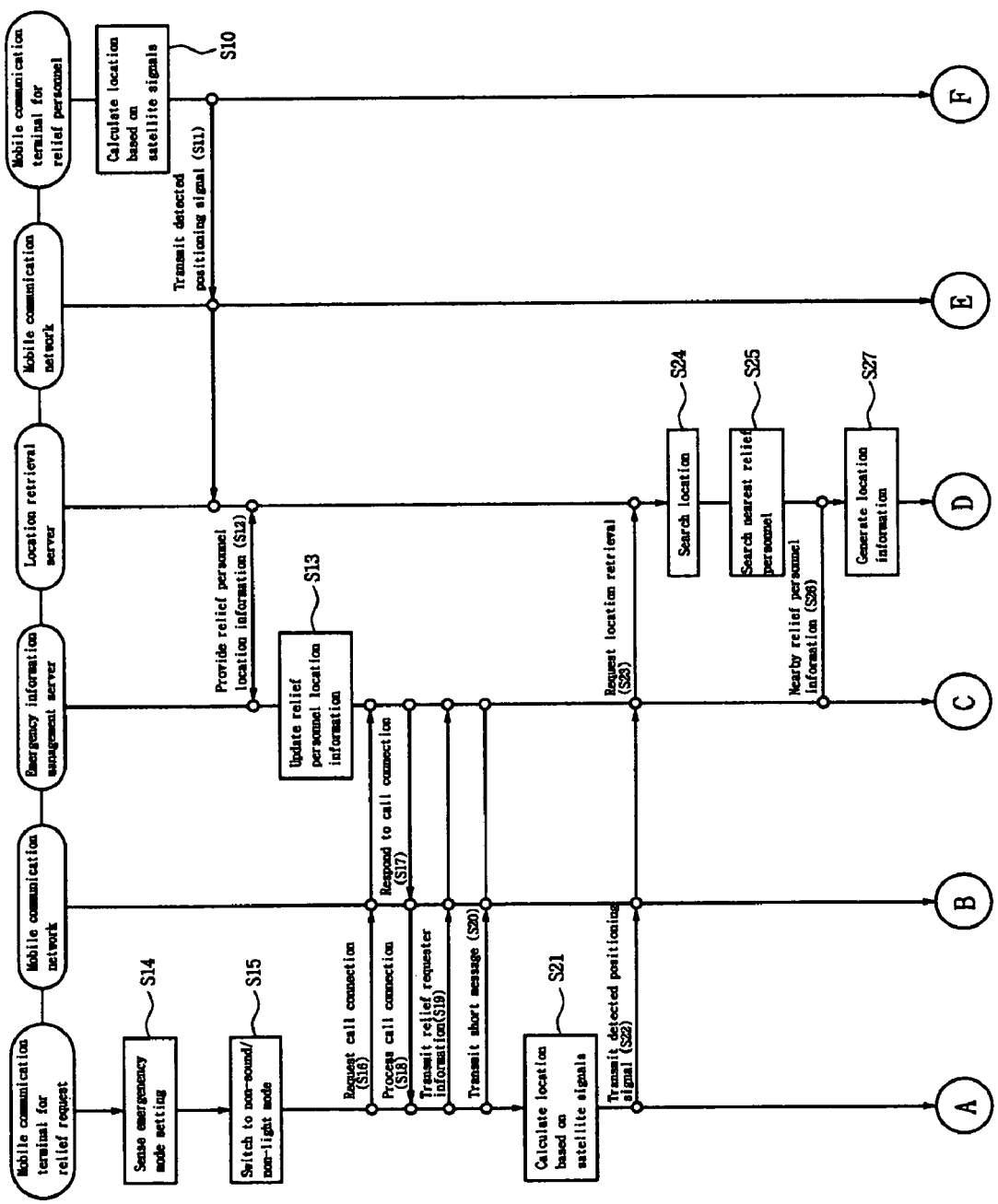
FIG. 4a and FIG. 4b show process flows of methods for providing emergency relief location information using the mobile communication network according to a first embodiment of the present invention.
Figure 4B:
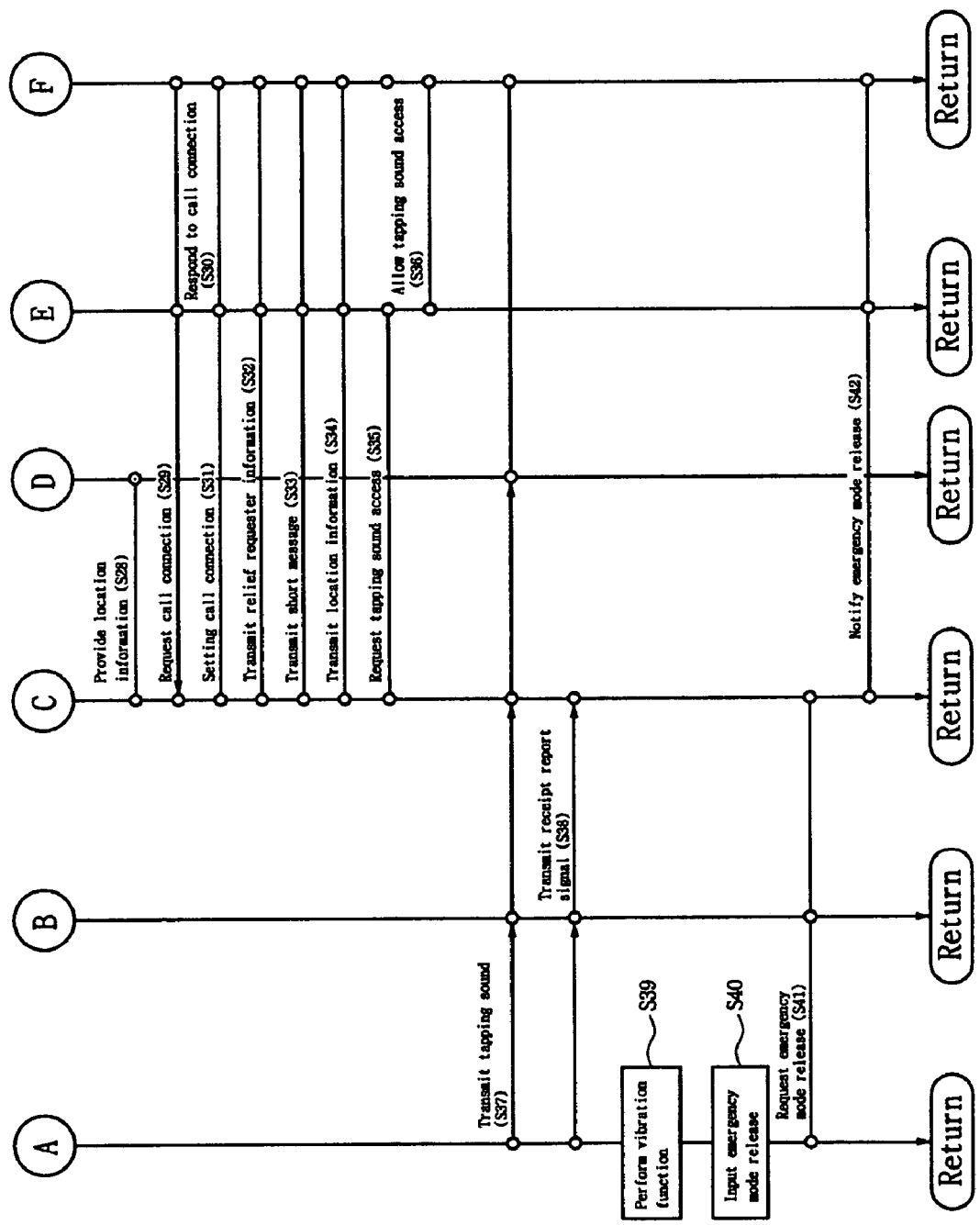

The operation of the system for providing emergency relief location information constructed above according to the first embodiment of the present invention will now be described in detail with reference to the process flows shown in FIG. 4a and FIG. 4b.

Each of the mobile communication terminals 4 that are distributed across a wide range of regions calculates coordinates on the longitude/latitude based on the satellite signals received from the GPS satellites SAT1 to SAT3 (S10). The terminal 4 then transmits the detected positioning signal to the location retrieval server 14 and the emergency information management server 18 through the mobile communication network consisting of the mobile communication base station transceivers 6, the mobile communication repeater 8, the mobile communication controller 10 and the mobile communication switching system 12 (S11).

Next, the location retrieval server 14 retrieves a current location of the relief personnel based on the detected positioning signal and then stores location information accordingly in the location retrieval database 16. At the same time, the location retrieval server 14 reports location information to the emergency information management server 18 (S12).

Accordingly, the emergency information management server 18 is informed of that location information on the relief personnel is updated from the location retrieval server 14 (S13).

In this state, if a given relief requester is placed in an emergency situation such as a threat situation by a red-handed robber, a violent criminal, etc., shadowing by a criminal for an illegal purpose, intrusion into the inside of a house by an invited guest, a distress condition at the mountains, and the like, the mobile communication terminal 2 owned by the relief requester senses the setting of the emergency mode as the emergency key button therein is continually depressed for a given time interval (for example 3 seconds) (S14). After the emergency mode is set, the mobile communication terminal 2 is switched to a non-sound/non-light mode while preventing the receipt of a call from a counterpart (S15).

The mobile communication terminal 2 for the relief request requests a call connection using an emergence contact point that was previously stored, i.e., a telephone number of the emergency information management server 18, via the mobile communication network (S16). According to a response of the emergency information management server 18 to the call connection (S17), the mobile communication network executes the call connection processing (S18).

Accordingly, the mobile communication terminal 2 for the relief request transmits information on the relief requester that was previously stored (for example, the name, social card number, an address, a telephone number, etc. of the relief requester) (S19) and at the same time transmits a short message containing emergency information (S20).

Meanwhile, if the emergency mode is executed, the mobile communication terminal 2 for the relief request calculates coordinates on the longitude/latitude based on the satellite signals received from the GPS satellites SAT1 to SAT3 (S21). The mobile communication terminal 18 then transmits a detected positioning signal calculated accordingly to the emergency information management server 18 through the mobile communication network (S22).

Accordingly, the emergency information management server 18 requests a location retrieval of the mobile communication terminal 2 for the relief request to the location retrieval server 14 (S23). Next, the location retrieval server 14 retrieves the location based on the detected positioning signal received from the mobile communication terminal 2 for the relief request (S24).

At this time, the location retrieval server 14 retrieves a mobile communication terminal for the relief personnel nearest to the current location of the mobile communication terminal 2 for the relief request from the location retrieval database 16 (S25). The location retrieval server 14 then transmits information on the nearest relief personnel calculated accordingly to the emergency information management server 18 (S26).

At the same time, the location retrieval server 14 generates a location information signal of a character and graphic signal form for informing the current location of the relief requester, by referring to the character and graphic information stored in the location retrieval database 16 based on the detected positioning signal from the mobile communication terminal 2 for the relief request (S27). Next, the location retrieval server 14 provides the generated location information signal to the emergency information management server 18 (S28).

The emergency information management server 18 requests a call connection through the telephone number of the nearest mobile communication terminal 4 for the relief personnel among the plurality of the relief personnel that are stored in the emergency information database 24, based on information on the nearest relief personnel received from the location retrieval server 14 (S29). If the mobile communication terminal 4 for the relief personnel responds to the request for the call connection (S30), a call connection setting is established through the mobile communication network (S31).

In this state, the emergency information management server 18 transfers information on the relief requester received from the mobile communication terminal 2 for the relief request to the mobile communication terminal 4 for the relief personnel (S32), and at the same time transfers short character information containing emergency information (S33).

Furthermore, the emergency information management server 18 transmits location information of a character and graphic signal form that was generated by the location retrieval server 14, to the mobile communication terminal 4 for the relief personnel through the mobile communication network. The mobile communication terminal 4 then displays map data contained in location information and character data on its display unit, so that the relief personnel can know the current location of the mobile communication terminal 2 for the relief request.

Next, the emergency information management server 18 performs the connection request so that the tapping sound transmitted according to the tapping mode of the mobile communication terminal 2 for the relief request can be transmitted to the mobile communication terminal 4 for the relief personnel (S35). Further, the mobile communication switching system 12 permits the connection so that the tapping sound from the mobile communication terminal 2 for the relief request can be transmitted to the mobile communication terminal 4 for the relief personnel according to the connection request of the emergency information management server 18 (S36).

Accordingly, the tapping sound signal from the mobile communication terminal 2 is transferred to the telephone 22 connected to the emergency information management server 18 and also to the mobile communication terminal 4 for the relief personnel (S37).

At this time, if the mobile communication terminal 4 for the relief personnel normally receives information on the relief requester, the short character information, the location information and the tapping sound, the emergency information management server 18 transmits a receipt report signal to the mobile communication terminal 2 for the relief request (S38). After receiving the receipt report signal, the mobile communication terminal 2 executes a vibration mode to perform a vibration function of a specific signal form (for example, continuous vibration of three times) (S39).

Meanwhile, in the event where the emergency situation for the relief requester is released, a specific emergency key button in the mobile communication terminal 2 for the relief request is again depressed in order to input the release of the emergency mode (S40). According to the reentry of the emergency key button, a release request of the emergency mode is performed for the emergency information management server 18 through the mobile communication network (S41).

Accordingly, the emergency information management server 18 notifies the release of the emergency mode to the mobile communication terminal 4 for the relief personnel while releasing the emergency state received from a corresponding relief requester according to the release request of the emergency mode from the mobile communication terminal 2 for the relief request (S42).

At this time, it is preferable that the emergency information management server 18 receives, as an effective request, only the release request of the emergency mode that is received in a state where the receipt report signal is transmitted to the mobile communication terminal 2 for the relief request, as in step (S38).

Meanwhile, the location of the relief requester that is displayed on the mobile communication terminal for the relief personnel according to the GPS location information, is displayed on the map information. However, it is difficult to exactly find the location of the relief requester due to an error, etc. in the map information itself even if the relief personnel accesses near the relief requester. For this reason, there is a difficulty in rapidly finding the relief personnel.

In view of the above, in another embodiment of the first embodiment of the present invention, there is further provided a means for tracing the location of the relief requester so that the relief personnel can exactly trace the location of the relief requester after reaches the place based on the coordinates by the detection of the GPS location of the relief requester.

In the system for providing emergency relief location information using the mobile communication network according to the present invention, the GPS receiving means of the mobile communication terminal for the relief personnel further includes a means for comparing own detected location information with location information of the mobile communication terminal for the relief requester to calculate the distance and direction from the relief requester, and then displaying a location coordinate of the relief requester along with own location coordinate of the mobile communication terminal for the relief personnel.

As constructed above, if graphic information depending on the location information of the relief requester is received from the emergency management system, the mobile communication terminal for the relief personnel displays own location coordinate found using the GPS receiving means on its display unit along with the location coordinate of the relief requester, compares the location coordinate of the relief requester received from the emergency management system with own location coordinate of the mobile communication terminal for the relief personnel found using the GPS receiving means, and then displays both the distance and direction from the mobile communication terminal for the relief requester.

Therefore, the relief personnel can reach the location of the relief requester, while seeing his or her coordinate and the coordinate of the relief requester that are displayed on the map information on which the location of the mobile communication terminal for the relief requester is displayed.

In the case where the GPS is received, however, if two GPS receivers receive the GPS signals from different artificial satellites to detect the location, an error in the location data between the artificial satellites may happen.

For this reason, if the artificial satellites used to detect the location in the GPS receiving means of the mobile communication terminal for the relief request and the GPS receiving means of the mobile communication terminal for the relief personnel are different, it is difficult for the mobile communication terminal for the relief personnel to detect a correct location of the mobile communication terminal for the relief requester.

In view of the above, the mobile communication terminal for the relief requester adds information on the artificial satellites that is used to detect the location to the location information that is sent to the emergency management system. Further, the emergency management system transmits information on the artificial satellites to the relief personnel along with the location information of the relief requester. Thereby, the mobile communication terminal for the relief personnel can correctly trace the location of the relief requester by detecting the location using the same artificial satellite to the mobile communication terminal for the relief requester.

In other words, as the same artificial satellites receive the signal, the error in the location data between the artificial satellites is reduced. It is thus possible to correctly detect the distance between the mobile communication terminal for the relief requester and the mobile communication terminal for the relief personnel.

The mobile communication terminal for the relief requester the location information provided to the emergency management system with information on the GPS satellites added thereto. The emergency management system provides information on the satellites received from the relief requester to the mobile communication terminal for the relief personnel while providing it as graphic information according to the location information on the mobile communication terminal for the relief requester.

According to information on the satellites, the mobile communication terminal for the relief personnel selects the artificial satellite that was used to detect the location in the mobile communication terminal for the relief requester and then detects own location coordinate. The mobile communication terminal for the relief personnel then displays own detected location coordinate on the coordinate at which the location of the mobile communication terminal for the relief requester is indicated. Next, the mobile communication terminal for the relief personnel compares own detected location coordinate with the coordinate of the relief requester and then displays both the distance and direction of the mobile communication terminal for the relief requester from the location of the mobile communication terminal for the relief personnel.

Accordingly, the relief personnel can reach the location of the relief requester while seeing the display state.

In other words, this reduces an error in detecting the location depending on the use of different artificial satellites when three artificial satellite signals used to detect the 2-D location are received. If a location of a given point X is detected using one GPS receiver, an error range of the detected coordinate for the absolute coordinate at the point X is about 20 m to 30 m. An error when there are two GPS receivers that receive the signals from the different GPS artificial satellites to detect respective locations, is 40 m to 60 m by maximum. However, if both the two GPS receivers receive the signals from the same GPS artificial satellites to detect their absolute distance, the error (about 20 m to 30 m) is offset, so that the distance between the two points where the GPS receivers are located can be correctly detected.

Therefore, if a GPS receiver on one side (GPS receiver on a transmitter' side) transmits the artificial satellite used to detect the location (at least three artificial satellite used to detect the location, of eighteenth artificial satellites) to a GPS receiver on the other side (GPS receiver on a receiver' side), receives a signal from the same artificial satellite to detect the respective locations, and then operates the detected coordinates to calculate the distance among the artificial satellites, it is possible to calculate a correct distance among the artificial satellites by offsetting the error occurred in detecting the coordinate.

Further, in another embodiment, an ultrasonic wave or a radio frequency beacon signal can be used, by allowing the relief personnel to reach a nearby place using the location information of the relief requester and then to detect a correct location of the relief requester.

In this case, the mobile communication terminal for the relief requester further includes a beacon signal generator for generating the ultrasonic wave or the radio frequency beacon signal. The mobile communication terminal for the relief personnel further includes a beacon signal receiver for receiving the beacon signal and informing the result. Through these configurations, the nearby relief personnel can find and reach the location of the relief requester.

If the relief requester selects the emergency key button, the radio frequency beacon signal is generated from the beacon signal generator.

As in the above embodiments, the relief personnel approach a corresponding place based on the location information that was transmitted from the relief requester to the emergency management system. At this time, the relief personnel receive the beacon signal using the beacon signal receiver of the mobile communication terminal for the relief personnel and then determine whether the mobile communication terminal for the relief requester is located near to the personnel.

In the above, the beacon signal receiver of the mobile communication terminal for the relief personnel senses that the beacon signal has inputted thereto only when the beacon signal of over a power level of over a threshold value that was predetermined is received. If the beacon signal of over the power level of over the set threshold voltage is received, it means that the mobile communication terminal for the relief requester does exist at a nearby place. The mobile communication terminal for the relief personnel can calculate the distance from the mobile communication terminal for the relief requester by finding the power level of the beacon signal.

Such a result is displayed on the display means. While moving toward the mobile communication terminal for the relief requester while seeing the coordinate of the relief requester and own coordinate, the relief personnel can reach the location of the mobile communication terminal for the relief requester that was detected by the beacon signal, by resetting the received power level of the beacon receive signal.

In other words, in the event where the relief personnel become more distant from the location of the relief requester as he or she is moving, the personnel must further approach the location of the relief requester by increasing the receive power level of the beacon receive signal in order to receive the beacon signal. Through this procedure, the relief personnel can easily find the relief requester.

Meanwhile, in the case that the beacon signal generator is included in the mobile communication terminal for the relief requester as above, if beacons for receiving the beacon signal are installed around, it is possible to detect a more correct location by receiving the beacon signal generated by the relief requester from these beacons.

The mobile communication terminal for the relief requester further includes the beacon signal generator for generating the radio frequency beacon signal. The emergency management system detects the location of the mobile communication terminal for the relief requester, according to a result of the beacon signal received from the beacons installed around the mobile communication terminal for the relief requester, and then provides the detected location to the mobile communication terminal for the relief personnel.

In the embodiments of the present invention having those constructions, if the relief requester selects the emergency key button, the beacon signal generator generates the radio frequency beacon signal.

The beacons around the mobile communication terminal for the relief requester receive the beacon signal generated from the beacon signal generator. As such, the beacons that received the beacon signal inform the emergency management system of the fact.

The emergency management system can detect a correct location of the mobile communication terminal for the relief requester from the beacons that received the beacon signal generated from the mobile communication terminal for the relief requester.

In the case where a plurality of the beacons, for example three or more beacons receive the beacon signal, it is possible to detect a correct location where the beacon signal was generated from the locations of the three beacons through a triangle measurement.

Location information thus detected is provided to the mobile communication terminal for the relief personnel. The relief personnel can trace a nearby location of the relief personnel based on this location information.

In the above, as above, the mobile communication terminal for the relief personnel further includes the beacon receiver, and such a beacon signal is transmitted to the emergency management system. By doing so, the location of the mobile communication terminal for the relief requester can be detected along with the beacon having a fixed location.

Furthermore, places where the relief requester frequently visits may be registered on the mobile communication terminal for the relief requester. In the emergency mode, the places are added to emergency contact information and are then transmitted to the emergency management system. By considering a corresponding location as a candidate location when the displayed location of the relief requester is around the registered location, the relief personnel can reach the location of the relief requester.

In other words, if the coordinate of the mobile communication terminal for the relief requester transmitted to the emergency management system is the 'house' that was previously registered by the relief requester or around a 'house', the relief personnel visits the house of the relief request at the first time as a candidate location. Therefore, the relief personnel can rapidly find the relief requester.

Figure 5:
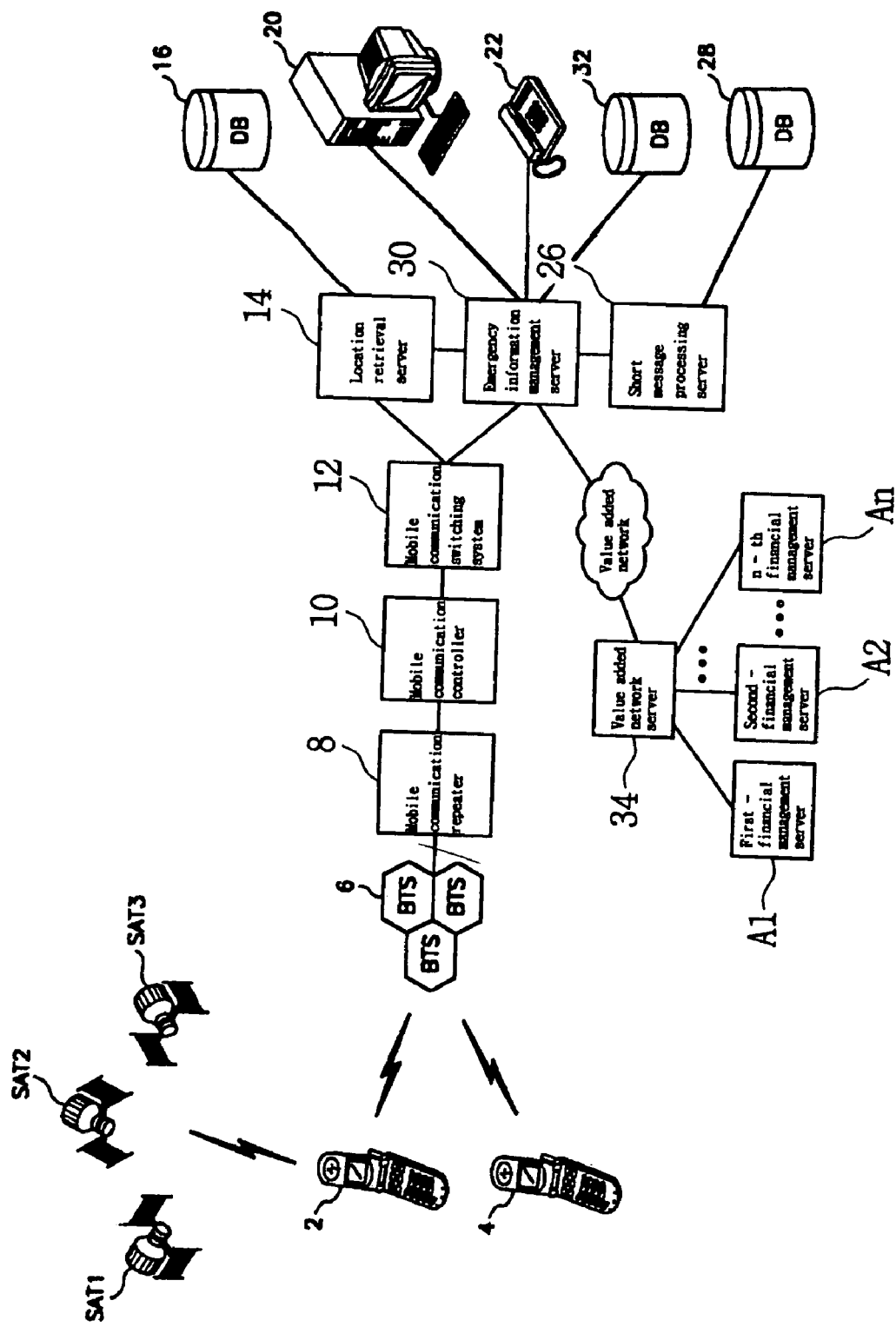
FIG. 5 is a diagram illustrating the construction of a system for providing emergency relief location information using a mobile communication network according to a second embodiment of the present invention.

FIG. 5 is a diagram illustrating the construction of a system for providing emergency relief location information using the mobile communication network according to a second embodiment of the present invention. The second embodiment is contrived to prevent any damage in the financial transaction of a relief requester, by stopping the financial transaction of the relief requester if there is a relief request.

In the second embodiment described with reference to FIG. 5, the constitutional elements having the same functions to those in the first embodiment described with reference to FIG. 1 are designated with the same reference numerals and explanation on them will not be given for simplicity.

In FIG. 5, the mobile communication system to which a method of providing location information according to the second embodiment of the present invention is applied, includes a mobile communication terminal 2 for a relief request, a mobile communication terminal 4 for a relief personnel, a plurality of mobile communication base station transceivers 6, a mobile communication repeater 8, a mobile communication controller 10, a mobile communication switching system 12, a location retrieval server 14, a location retrieval database 16, an emergency information management server 30, a management computer terminal 20, a telephone 22, an emergency information database 32, a short message processing server 26, a short character database 28 and GPS satellites SAT1 to SAT3.

The mobile communication system further includes a value added network, a value added network server 34, and first to $n^{th}$ financial management servers A1 to An.

If the mobile communication terminal 2 for the relief request executes the emergency mode to transmit information on the relief requester and short character information through the mobile communication network, the emergency information management server 30 requests the value added network server 34 that it should stop the financial transaction for the relief requester, based on financial information of the relief requester stored in the emergency information database 32.

The emergency information database 32 has stored therein personal information on a plurality of relief requesters that were registered so that the relief request can be made through the mobile communication terminal 2 for the relief request, and financial information on the financial institutes through which the relief requester transacts. Such financial information may contain the name of a bank, an account number used in the bank, the name of a credit card company, the type of the credit card, the number of the credit card, an account number of the stocks and bonds, and the like.

If there is a request from the emergency information management server 30 that the financial transaction for a specific relief requester should be stopped after the value added network server 34 is connected to the emergency information management server 30 through the value added network, the value added network server 34 performs an emergency authentication process that was previously agreed with a corresponding emergency information management server 30 to stop the financial transaction of the financial institute to which the relief requester belongs among the plurality of first to $n^{th}$ financial management servers A1 to An.

The first to $n^{th}$ financial management servers A1 to An are for on-line managing the financial transaction state of the financial institutes such as the bank, the credit card company, the security company, etc. If a request that the financial transaction for a specific relief requester be stopped is received via the value added network server 34, the management servers A1 to An stops the transaction of financial accounts, credit card numbers, account numbers of the stocks or bonds, etc., which are owned by the relief requester, based on emergency authentication processing information for the emergency information management server 18.

Further, if the financial transaction for the relief requester is attempted, the financial management servers A1 to An may perform a virtual transaction that is same to a normal transaction in appearance but is not an actual transaction.

In other words, in case of an account transfer, the financial management server may virtually send a result of the account transfer to the person concerned, in order to have a criminal who is taking the relief requester as a hostage to think that the transaction is normally performed.

At this time, if there is an attempt for a direct transaction such as a withdrawal of cash through the automated teller machine, etc., the financial management server may additionally generate an error message such a malfunction, computer error, etc. for a corresponding transaction in order to delay the withdrawal of cash.

Meanwhile, if there is a release request for the emergency mode from the mobile communication terminal 2 for the relief request, the emergency information management server 30 requests the value added network server 34 that the stopped financial transaction should be restored.

Figure 6:
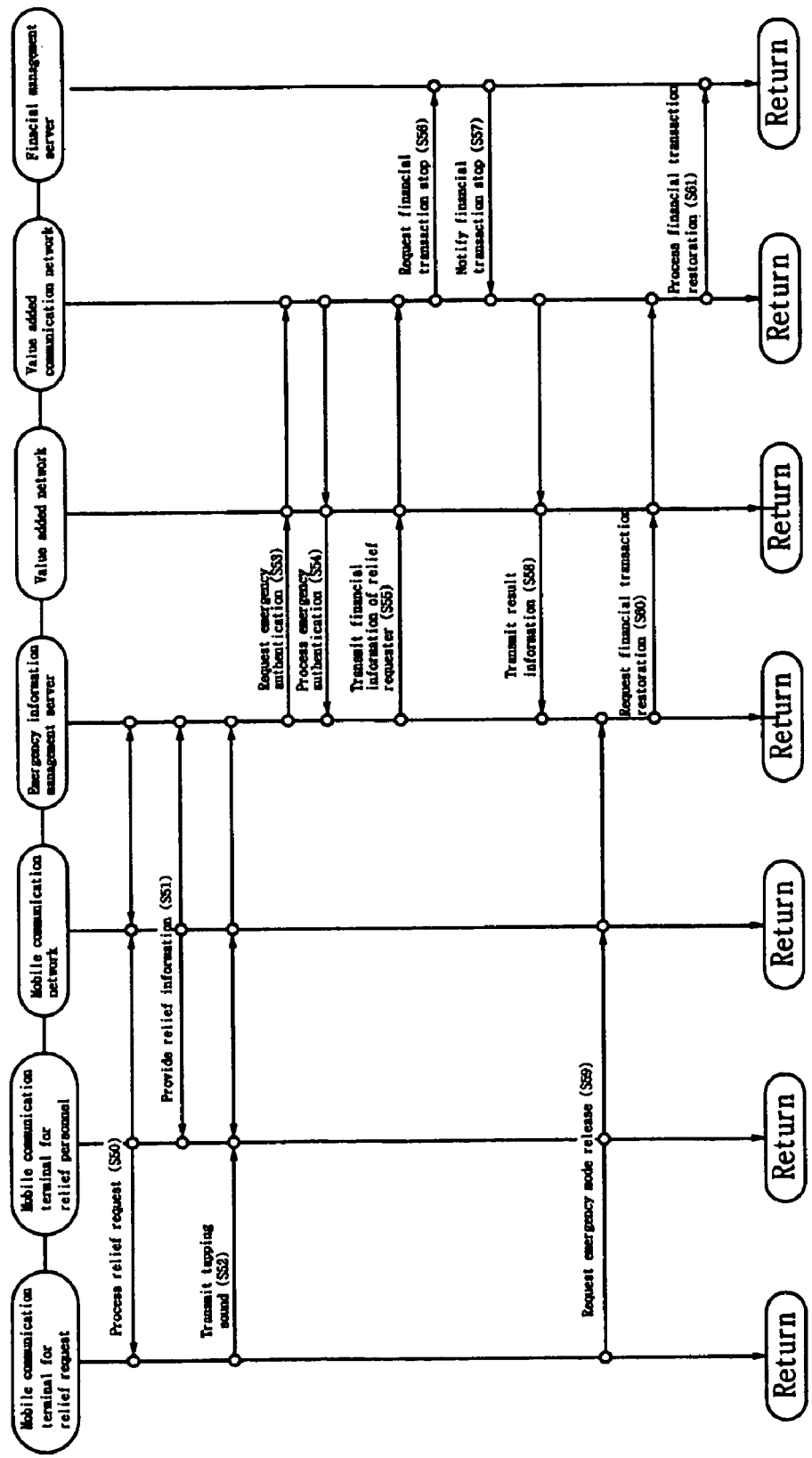
FIG. 6 shows a process flow of a method for providing emergency relief location information using the mobile communication network according to a second embodiment of the present invention.

The second embodiment of the present invention constructed above will now be described in detail with reference to the process flows shown in FIG. 6.

If a given relief requester is placed in an emergency situation, the mobile communication terminal 2 of the relief requester performs an emergency mode to transmit information on the relief requester and short character information to the emergency information management server 30, whereby a relief request is initiated. Further, the mobile communication terminal 2 informs its current location, by transmitting a detected positioning signal depending on a result of a satellite signal calculated in the GPS satellites SAT1 to SAT3 to the emergency information management server 30 (S50).

In this state, the emergency information management server 30 performs a call connection with the mobile communication terminal 4 for the relief personnel nearest to the mobile communication terminal 2 for the relief request, and then transfers information on the relief requester and short character information that were received from the mobile communication terminal 2. At the same time, the server 30 transmits a location information signal generated based on the detected positioning signal to the mobile communication terminal 4 for the relief personnel (S51).

Next, the mobile communication terminal 2 for the relief request performs a tapping mode to transmit a tapping sound to the mobile communication terminal 4 for the relief personnel and the emergency information management server 30, respectively (S52).

Meanwhile, if the mobile communication terminal 2 for the relief request transmits information on the relief requester and short character information in order to inform the emergency situation, the emergency information management server 30 extracts personal information of a corresponding relief requester from a plurality of relief requesters that are stored in the emergency information database 32, based on information on the relief requester, and also extracts financial information related to that personal information.

In this state, the emergency information management server 30 accesses the value added network server 34, through the value added network, to request an emergency authentication (S53). According to the request, the value added network server 34 processes the emergency authentication based on the authentication agreement that was previously agreed (S54).

Accordingly, the emergency information management server 30 transmits financial information of the relief requester that was extracted from the emergency information database 32 (S55). Further, the value added network server 34 accesses the financial management servers of the financial institutes to which a corresponding relief requester belongs of the plurality of the firs to $n^{th}$ financial management servers A1 to An, based on the financial information received from the emergency information management server 30, and then requests that the financial transaction for the relief requester be stopped (S56).

According to the stop request for the financial transaction from the value added network server 34, the financial management server of the financial institute to which the relief requester belongs retrieves the history of the financial transaction and then stops the financial transaction. The financial management server 34 then informs the value added network server 34 of the result of the stopped transaction (S57).

Next, the value added network server 34 transmits information on the result that the financial transaction for the relief requester has stopped to the emergency information management server 30 (S58).

At this time, the financial institute stops the actual transaction. However, if a financial transaction for a corresponding relief requester is attempted, the financial institute performs a virtual transaction. In the case where a direct transaction is performed in performing the virtual transaction, the financial institute generates a message such as computer error, machine malfunction, etc. in order to delay the behavior of a criminal who makes a corresponding transaction. As described above, the financial institute transmits the transaction result to the emergency information management server 30 via the value added network server 34 so that the emergency information management server 30 is informed of the fact.

Meanwhile, if it is required that the emergency mode be released since the emergency situation is finished, the mobile communication terminal 2 for the relief request requests the emergency information management server 30 that it should release the emergency mode through the mobile communication network (S59). In response to the request, the emergency information management server 30 performs the restoration request of the financial transaction whose transaction for the relief requester has been stopped, for the value added network server 34 (S60).

Therefore, the value added network server 34 performs the restoration process of the financial transaction for the financial management server that stopped the financial transaction for the relief requester (S61).

Meanwhile, according to another embodiment of the present invention, the system for providing emergency relief location information using the mobile communication network includes:

a mobile communication terminal on a transmitter' side having a key for executing a location transmit mode, a location detecting means for detecting a current location, a storage means for storing contact information of a location information providing system to which a call connection will be made when the location transmit mode is performed, and a control means for controlling a location transmit mode process that allows the user of the mobile communication terminal on the transmitter' side to transmit the detected location to the mobile communication terminal on a desired receiver' side; and the location information providing system that generates a location information signal of the mobile communication terminal on the transmitter' side using the detected positioning signal received from the mobile communication terminal on the transmitter' side connected to the providing system through the mobile communication network, and transmits the location information signal provided to the mobile communication terminal on the receiver' side that is specified by the user through the mobile communication network so that location information of the mobile communication terminal on the transmitter' side can be transmitted to the mobile communication terminal on the receiver' side.

Figure 7:
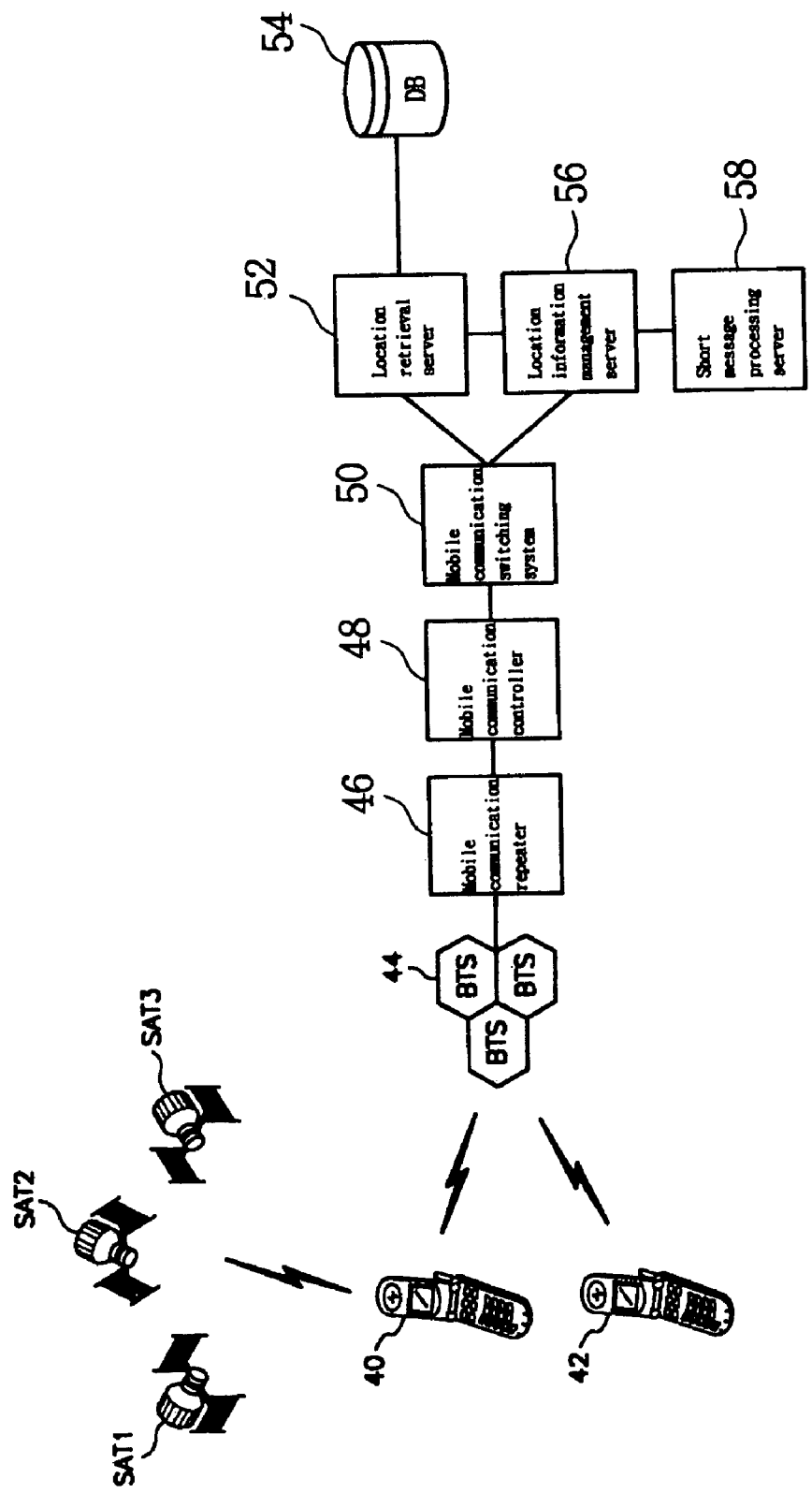
FIG. 7 is a diagram illustrating the construction of a system for providing location information using a mobile communication network according to a third embodiment of the present invention, FIG. 8a and FIG. 8b exemplarily show states where location information of a mobile communication terminal on a transmitter' side is displayed on a mobile communication terminal on a receiver' side according to a third embodiment of the present invention.

FIG. 7 is a diagram illustrating the construction of the system for providing location information using the mobile communication network according to a third embodiment of the present invention. The third embodiment is contrived to allow a specific mobile communication subscriber to inform a desired counterpart of its location information. This may be usefully applied to a promise location between persons as well as a relief request in case of an accident, distress, etc.

As shown in FIG. 7, the mobile communication system to which a method of providing location information according to a third embodiment of the present invention is applied includes a mobile communication terminal 40 on a transmitter' side, a mobile communication terminal 42 on a receiver' side, a plurality of mobile communication base station transceivers 44, a mobile communication repeater 46, a mobile communication controller 48 and a mobile communication switching system 50. The system further includes a location information providing system having a location retrieval server 52, a location retrieval database 54, a location information management server 56 and a short message processing server 58, and GPS satellites SAT1 to SAT3.

In FIG. 7, the mobile communication terminal 40 on the transmitter' side has built a special location transmit key button therein for executing the location transmit mode to transmit information informing its current location. Further, the terminal 40 has embedded a GPS receiving function for receiving information from the GPS satellites.

If the location transmit key button is depressed, the mobile communication terminal 40 on the transmitter' side performs the location transmit mode to activate the short message input function, so that the short message to be sent to a given receiving counterpart is written. Further, the terminal 40 calculates a coordinate on the longitude/latitude based on the satellite signals from the GPS satellites SAT1 to SAT3 to generate a detected positioning signal accordingly. At this time, the terminal 40 inputs a telephone number assigned thereto into the mobile communication terminal on a desired receiver' side through a call connection processing with the location information management server 56, and then transmits the short message and the detected positioning signal.

The mobile communication terminal 42 on the receiver' side displays, on its display unit, short character information that was written by the mobile communication terminal 40 on the transmitter' side and received from location information management server 56 through the mobile communication network, and the location information signal of a character and graphic signal form that was generated based on the detected positioning signal.

In FIG. 7, the plurality of the mobile communication base station transceivers 44 are distributed around the regions where the mobile communication terminal 40 on the transmitter' side and the mobile communication terminal 42 on the receiver' side are moving. The transceivers 44 can transmit/receive by wireless the short message, the satellite detecting signal, character and graphic information so that the mobile communication terminal 40 on the transmitter' side can transfer/register voice communication and radio data while moving.

The mobile communication repeater 46 is for relaying the mobile communication base station transceivers 44 and the mobile communication controller 48. The mobile communication controller 48 is for performing a matching function of the mobile communication base station transceivers 44 via the mobile communication repeater 46, a handoff handling among the base station transceiver cells, and a call connection control.

The mobile communication switching system 50 performs an interactive call connection between the mobile communication terminal 40 on the transmitter' side and the location information management server 56, and the mobile communication terminal 42 on the receiver' side and location information management server 56, so that the short message, the detected positioning signal, and character and graphic information can be transferred among them.

The location retrieval server 52 writes the location information signal of the character and graphic form (i.e., map data) based on the detected positioning signal from the mobile communication terminal 40 on the transmitter' side, according to a request for a location trace by the location information management server 56 that the location of the mobile communication terminal 40 on the transmitter' side be traced.

The location retrieval database 54 has stored therein map information on the entire region along which the mobile communication terminal 40 can move, and character information on the name of a place and topographic features.

In the above, the location retrieval server 52 writes the location information signal of the character and graphic signal form for finding the location of the mobile communication terminal 40 on the transmitter' side, based on map information, and character information on the name of a place and topographic features that are stored in the location retrieval database 54.

The location information management server 56 performs a call connection with the mobile communication terminal 40 on the transmitter' side via the mobile communication switching system 50 and then receives short character information and the detected positioning signal. Further, the location information management server 56 requests the location retrieval server 52 to retrieve the location based on the detected positioning signal and to generate the location information signal. Simultaneously, the server 56 performs the call connection with the mobile communication terminal 42 on the receiver' side based on the telephone number inputted by the mobile communication terminal 40 on the transmitter' side and then transmits short character information and the location information signal.

The short message processing server 58 is for processing the short message received from the mobile communication terminal 40 on the transmitter' side and then transferring the processed message to the mobile communication terminal on the receiver' side.

Figures 8A, 8B:
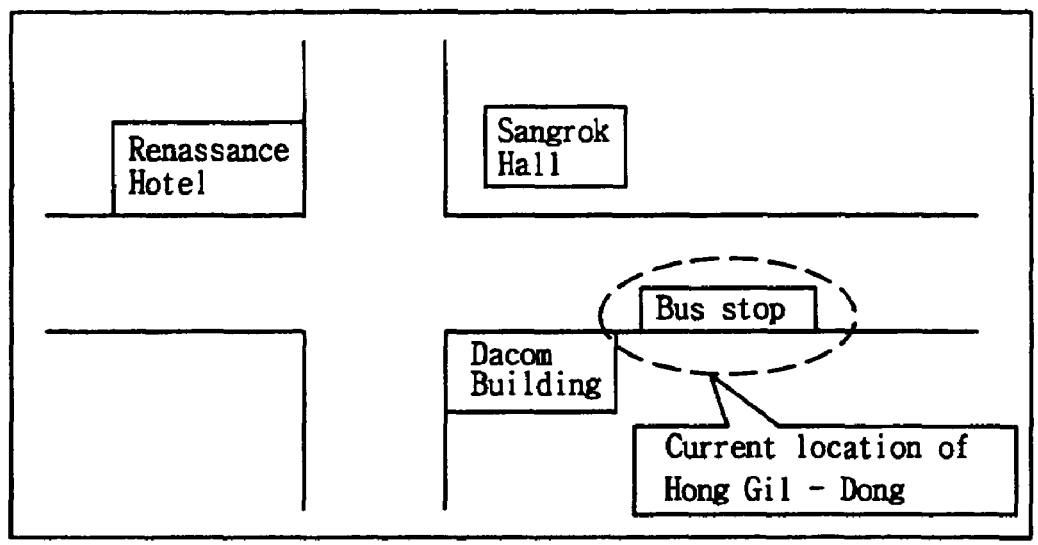

Meanwhile, if the location information signal of the graphic signal form is received from the location information management server 56 through the mobile communication network, the mobile communication terminal 42 on the receiver' side displays the map data of the graphic form on its display unit and visualizes the current location of the mobile communication terminal 40 on the transmitter' side within a tolerance of 20 m by a minimum, as shown in FIG. 8*a*.

Further, if short character information written by the mobile communication terminal 40 on the transmitter' side is received from the location information management server 56, the mobile communication terminal 42 on the receiver' side visually displays the message of the character form on its display unit, as shown in FIG. 8*b*.

Figure 9:
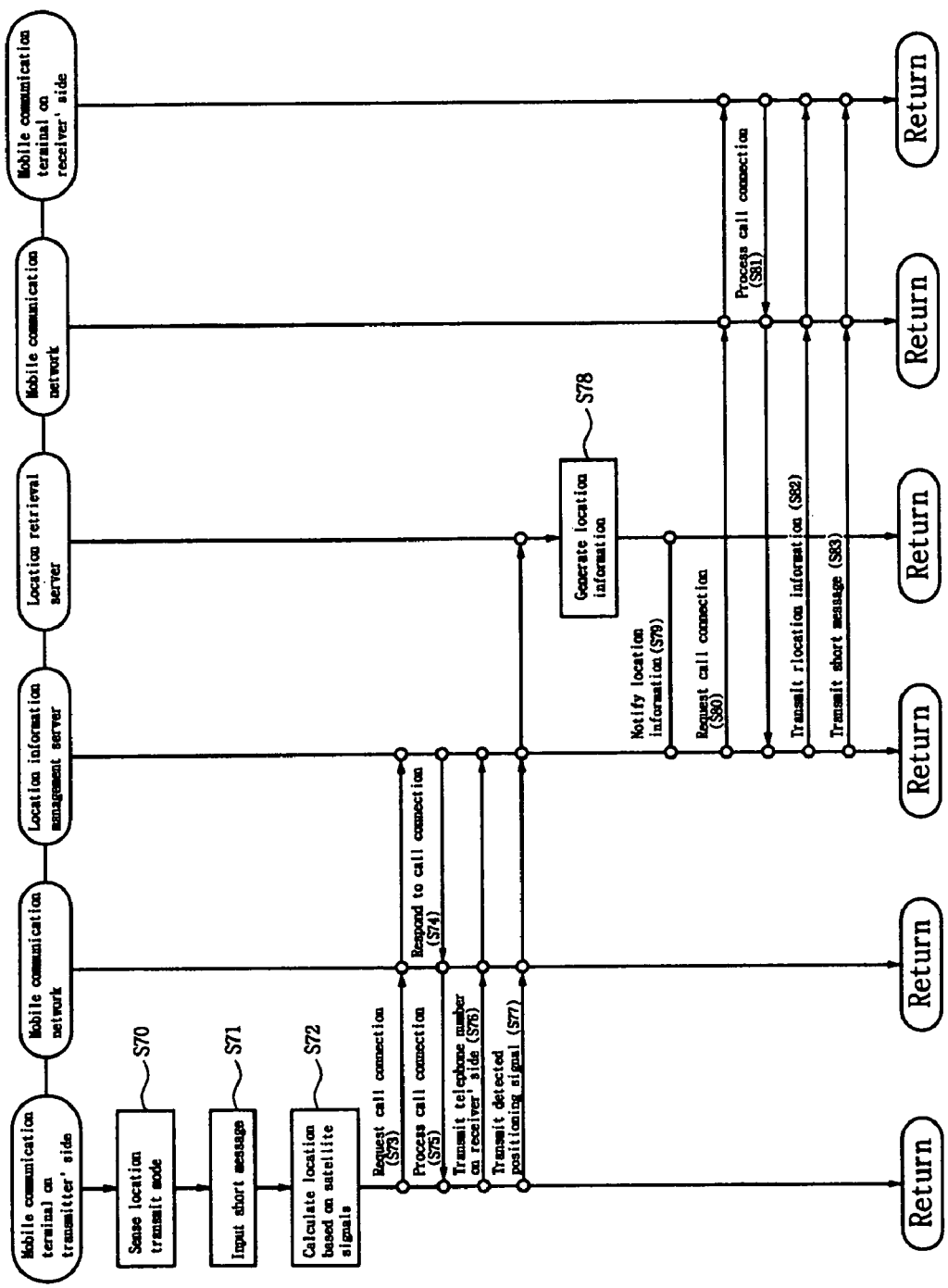
FIG. 9 shows a process flow of a method for providing location information using the mobile communication network according to a third embodiment of the present invention.

The operation of the third embodiment constructed above will now be described in detail with reference to the process flows shown in FIG. 9.

If the special location transmit key button is depressed by a user, the mobile communication terminal 40 on the transmitter' side performs the location transmit mode (S70) and also performs the short message input function so that the short messages which are combined using Korean/English/numbers are combined are written (S71).

In this state, the mobile communication terminal 40 on the transmitter' side calculates a coordinate on the longitude/latitude using the satellite signals received from the GPS satellites SAT1 to SAT3, and then generates a detected positioning signal depending on its current location (S72).

Next, the mobile communication terminal 40 on the transmitter' side performs a call connection with the location information management server 56 through the mobile communication network (S73). If the call connection request is performed by the location information management server 56 (S74), the mobile communication switching system 50 of the mobile communication network performs the call connection processing (S75).

The mobile communication terminal 40 on the transmitter' side transmits a telephone number of the mobile communication terminal 42 on a specific receiver' side, for informing its current location, in a state where the terminal 40 is connected to the location information management server 56 (S76). The mobile communication terminal 40 then transmits short character information and the detected positioning signal to the location information management server 56 (S77).

At this time, the location information management server 56 requests a location retrieval, by transmitting the detected positioning signal received from the mobile communication terminal 40 on the transmitter' side to the location retrieval server 52. Next, the location retrieval server 52 generates the location information signal, by referring to the map data of the character and graphic form stored in the location retrieval database 54 based on the detected positioning signal received from the mobile communication terminal 40 on the transmitter' side (S78).

In this state, if the location information signal is received from the location retrieval server 52 (S79), the location information management server 56 requests a call connection with the mobile communication terminal 42 on the receiver' side through the mobile communication network (S80). Accordingly, the call connection process is performed according to a response of the mobile communication terminal 42 on the receiver' side to the call connection (S81).

In a state where the location information management server 56 is connected to the mobile communication terminal 42 on the receiver' side, the location information management server 56 transmits the location information signal of the character and graphic signal form indicating a current location of the mobile communication terminal 40 on the transmitter' side (S82), and at the same time receives short character information that was written by the mobile communication terminal 40 on the transmitter' side (S83).

Therefore, based on the received location information signal, the mobile communication terminal 42 on the receiver' side visually displays, on its display unit, a current geographical location of the mobile communication terminal 40 and the message contents included in the short message.

The present invention is not limited to the above embodiments but various modifications and changes may be made thereto without departing from the scope and spirit of the invention. It has been described in the first embodiment that the mobile communication terminal 4 for the relief personnel includes a common mobile phone, a PCS terminal, IMT2000 terminal, etc. However, those skilled in the art will appreciate that the mobile communication terminal 4 may include a dedicated multimedia/communication terminal that can be used in the police station, the firehouse, the life relief institute, etc.

Furthermore, it has been described in the first embodiment that relief information is transmitted to only the emergency information management server and the nearest mobile communication terminal for the relief personnel specified by the emergency information management server in the emergency mode. It should be noted that various relief information and tapping sound can be transmitted to other mobile communication terminals or wire telephones (for example, a private guard company, a relative, a telephone owned by a friend, and the like) that may be specified by the mobile communication terminal for the relief request.

What is claimed is:

1. A system for providing emergency relief location information using a mobile communication network, comprising:

a mobile communication terminal for a relief requester having an emergency key for requesting a relief, a storage means for storing emergency contact information for an emergency contact in an emergency mode and emergency contact information to be transmitted to an emergency management system of an emergency contact point connected thereto, and a control means for allowing a relief requester to access the emergency management system of the emergency contact point that is previously stored in the emergency mode through the emergency key and then to transmit emergency contact information stored at the storage means, and controlling an emergency mode process so that only a call connection request to the emergency management system is permitted and a tapping mode for precluding a receiving speech and transmitting only a sending speech upon the call connection is automatically performed;

the emergency management system of the emergency contact point having an emergency information management server that finds a location of the mobile communication terminal for the relief requester according to emergency contact information from the mobile communication terminal for the relief requester that is transferred through the mobile communication network, and then transmits emergency contact information and location information of the relief requester that are received from the mobile communication terminal for the relief requester to a mobile communication terminal of a relief personnel adjacent to the mobile communication terminal for the relief requester; and the emergency management system further comprises a database for storing financial information of the relief requester, if emergency contact information is received from the mobile communication terminal for the relief requester, the emergency management system performs an emergency financial transaction authentication process for finding financial information of the relief requester from individual financial information and then transmitting financial information of the relief requester to the value added network server to stop a financial transaction for the relief requester, a value added network server for connecting the relief requester depending on information on the financial transaction received from the emergency management system and a corresponding financial institute to determine whether to stop the financial transaction for the relief requester, according to the request of the emergency management system to stop the financial transaction through the value added network and financial information of the relief requester, a financial institute system for stopping/restoring the transaction state for a corresponding financial transaction of the relief requester using information from the value added network, a financial institute system stops the financial transaction for a corresponding relief requester if a request for emergency authentication is received from the value added network server, and allows a virtual transaction process is performed as normal if a financial transaction for the relief requester is attempted.

2. The system as claimed in claim 1, wherein the financial information every person stored in the database contains the name of a bank, an account number used in the bank, the name of a credit card company, the type of the credit card, the number of the credit card, and an account number of the stocks and bonds.

3. The system as claimed in claim 1 wherein the financial institute system generates an error message to a corresponding transaction if a direct financial transaction for the relief requester such as a withdrawal of cash is made.

4. A method for providing emergency relief location information a mobile communication network, the method comprising the steps of:

a relief request access process by a mobile communication terminal of a relief requester, for executing an emergency mode according to the input of the emergency key of the mobile communication terminal to connect to an emergency management system of an emergency contact point that is previously stored at a storage means through a mobile communication network;

an emergency contact information transmit process by a mobile communication terminal for the relief requester, for transmitting information on the relief requester and emergency contact information containing location information, which are previously at the storage means, to the emergency management system;

a process of deciding the location of the relief requester by the emergency management system, for receiving emergency contact information from the mobile communication terminal for the relief requester and then generating a current location of the relief requester based on location information of the mobile communication terminal for the relief requester that is contained in emergency contact information;

a process of retrieving the relief personnel by the emergency management system, for retrieving the relief personnel nearest to the relief requester that is decided by retrieving location information of the relief personnel;

a process of commanding the relief personnel by the emergency management system, for accessing the mobile communication terminal of the searched relief personnel and then transmitting emergency contact information containing location information of the relief requester received from the relief requester, so that a corresponding relief personnel can perform a relief work;

a receipt report signal transmit process for transmitting a receipt report signal indicating that the relief request has been received to the mobile communication terminal for the relief requester, if the fact that information on the relief requester is received from the mobile communication terminal for the relief personnel;

a stop request process of the emergency management system for accessing the value added network server to transmit financial information on the relief requester and then requesting the stop of the financial transaction for a corresponding relief requester, if it is determined that emergency contact information received from the mobile communication terminal for the relief requester is a relief request depending on the emergency mode;

an emergency authentication request process of the value added network server for making a corresponding financial institute request to perform the emergency authentication process depending on the emergency mode, according to financial information of the relief requester received from the emergency management system at the request of the emergency management system to stop the financial transaction; and a financial transaction stop process for stopping the financial transaction when the financial transaction for a corresponding relief requester is attempted according to the emergency authentication by the value added network server, wherein a virtual transaction process is performed as normal when the financial transaction for the relief requester is attempted.

5. The method as claimed in claim 4, wherein in the financial transaction stop process of the financial institute, an error message for a corresponding financial transaction is generated when a direct financial transaction is attempted.

6. The method as claimed in claims 4 or 5, wherein the financial transaction stop process of the financial institute further includes a process of transmitting the result of the financial transaction depending on the stop of the financial transaction to the emergency management system via the value added network server.

* * * * *